United States Patent
Han et al.

(10) Patent No.: US 12,021,190 B2
(45) Date of Patent: Jun. 25, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG ENERGY SOLUTION, LTD., Seoul (KR)

(72) Inventors: Jun Hyeok Han, Daejeon (KR); Kyoung Ho Ahn, Daejeon (KR); Min Jung Kim, Daejeon (KR); Won Tae Lee, Daejeon (KR); Su Hyeon Ji, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/280,573

(22) PCT Filed: Sep. 7, 2022

(86) PCT No.: PCT/KR2022/013474
§ 371 (c)(1),
(2) Date: Sep. 6, 2023

(87) PCT Pub. No.: WO2023/038442
PCT Pub. Date: Mar. 16, 2023

(65) Prior Publication Data
US 2024/0047743 A1    Feb. 8, 2024

(30) Foreign Application Priority Data

Sep. 10, 2021  (KR) .................. 10-2021-0121309
Sep. 6, 2022   (KR) .................. 10-2022-0113087

(51) Int. Cl.
| | |
|---|---|
| H01M 10/0565 | (2010.01) |
| H01M 4/36 | (2006.01) |
| H01M 4/38 | (2006.01) |
| H01M 4/505 | (2010.01) |
| H01M 4/525 | (2010.01) |
| H01M 10/0567 | (2010.01) |
| H01M 10/0568 | (2010.01) |
| H01M 10/0569 | (2010.01) |
| H01M 10/0585 | (2010.01) |
| H01M 4/02 | (2006.01) |

(52) U.S. Cl.
CPC ....... *H01M 10/0565* (2013.01); *H01M 4/362* (2013.01); *H01M 4/382* (2013.01); *H01M 4/505* (2013.01); *H01M 4/525* (2013.01); *H01M 10/0567* (2013.01); *H01M 10/0568* (2013.01); *H01M 10/0569* (2013.01); *H01M 10/0585* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2002/0114997 A1 | 8/2002 | Lee et al. |
| 2014/0220427 A1 | 8/2014 | Yu et al. |
| 2015/0132639 A1 | 5/2015 | Kodama |
| 2016/0233509 A1 | 8/2016 | Haeupler et al. |
| 2019/0305374 A1 | 10/2019 | Tsay et al. |
| 2020/0185771 A1 | 6/2020 | Lee et al. |
| 2021/0218058 A1 | 7/2021 | Ahn et al. |
| 2021/0257660 A1 | 8/2021 | Ahn et al. |

FOREIGN PATENT DOCUMENTS

| | | |
|---|---|---|
| EP | 3648228 A1 | 5/2020 |
| JP | 2000-219774 A | 8/2000 |
| JP | 5921982 B2 | 5/2016 |
| JP | 2016-531971 A | 10/2016 |
| KR | 10-2014-0097026 A | 8/2014 |
| KR | 10-1884568 B1 | 8/2018 |
| KR | 10-2019-0065157 A | 6/2019 |
| KR | 10-2020-0029372 A | 3/2020 |
| KR | 10-2020-0029373 A | 3/2020 |
| KR | 10-2152304 B1 | 9/2020 |

OTHER PUBLICATIONS

International Search Report and Written Opinion dated Dec. 15, 2022, for corresponding International Patent Application No. PCT/KR2022/013474.
Extended European Search Report issued in application 22867710.0 dated Mar. 22, 2024.

*Primary Examiner* — Haixia Zhang
(74) *Attorney, Agent, or Firm* — Morgan, Lewis & Bockius LLP

(57) ABSTRACT

A non-aqueous electrolyte solution for a lithium secondary battery and a lithium secondary battery including the same. Specifically, the non-aqueous electrolyte solution for a lithium secondary battery of the present disclosure may include a lithium salt; a non-aqueous organic solvent; and an oligomer including a repeating unit derived from a monomer represented by Formula 1, a repeating unit derived from a monomer represented by Formula 2, and a repeating unit derived from a monomer represented by Formula 3. Also, the lithium secondary battery of the present disclosure may improve cycle characteristics and high-temperature storage characteristics by including the above non-aqueous electrolyte solution for a lithium secondary battery.

20 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application claims priority from Korean Patent Application Nos. 10-2021-0121309, filed on Sep. 10, 2021, and 10-2022-0113087, filed on Sep. 6, 2022, the disclosures of which are incorporated by reference herein.

BACKGROUND

Technical Field

The present disclosure relates to a non-aqueous electrolyte solution for a lithium secondary battery, which includes an additive capable of suppressing transition metal dissolution and stabilizing anions generated from a lithium salt, and a lithium secondary battery including the same.

BACKGROUND ART

There is a need to develop technology for efficiently storing and utilizing electrical energy as personal IT devices and computer networks are recently developed with the development of information society and the accompanying dependency of society as a whole on the electrical energy is increased.

A lithium secondary battery is a technology that is most suitable for various applications, wherein it has been used in electric vehicles and power storage devices as well as power sources of notebook computers and mobile phones in view of the fact that it may be miniaturized to be applicable to a personal IT device in comparison to a lead battery or nickel-cadmium battery, has high energy density and operating voltage, and may have high capacity.

A lithium ion battery is largely composed of a positive electrode formed of a transition metal oxide containing lithium, a negative electrode capable of storing lithium, a non-aqueous electrolyte solution that becomes a medium for transferring lithium ions, and a separator, and, among them, the non-aqueous electrolyte solution using a non-aqueous organic solvent, in which a lithium salt, such as $LiPF_6$, is dissolved, as a main component, is known as a factor that greatly affects stability or safety of the battery.

If $LiPF_6$, as the lithium salt in the non-aqueous electrolyte solution, is decomposed during battery operation, LiF and $PF_5$ are generated, and the LiF and $PF_5$ promote depletion of the non-aqueous organic solvent or generate a large amount of gas while reacting with the non-aqueous organic solvent, resulting in high-temperature performance degradation and poor safety. In addition, the lithium ion battery has a problem in that a side reaction is promoted, for example, transition metals are dissolved as positive electrode degradation is gradually intensified due to battery operation, and the dissolved transition metals are reduced at the negative electrode.

Thus, there is a need to develop a non-aqueous electrolyte solution capable of suppressing the dissolution of transition metals and preventing a side reaction between the non-aqueous electrolyte solution and the electrode by forming a stable film on a surface of the electrode at the same time.

DISCLOSURE OF THE INVENTION

Technical Problem

An aspect of the present disclosure provides a non-aqueous electrolyte solution for a lithium secondary battery which may suppress transition metal dissolution and stabilize anions generated from a lithium salt by including an oligomer which is obtained from a monomer based on an acrylate structure including a nitrile group (—CN) and a monomer based on an acrylate structure including a lactam group.

Another aspect of the present disclosure provides a lithium secondary battery in which cycle characteristics and high-temperature storage characteristics are improved by including the above non-aqueous electrolyte solution for a lithium secondary battery.

Technical Solution

According to an embodiment, the present disclosure provides a non-aqueous electrolyte solution for a lithium secondary battery which includes:
- a lithium salt;
- a non-aqueous organic solvent; and
- an oligomer including a repeating unit derived from a monomer represented by Formula 1, a repeating unit derived from a monomer represented by Formula 2, and a repeating unit derived from a monomer represented by Formula 3:

[Formula 1]

wherein, in Formula 1,
$R_1$ is hydrogen or an alkyl group having 1 to 3 carbon atoms, and
$R_2$ is an alkyl group having 1 to 20 carbon atoms.

[Formula 2]

wherein, in Formula 2,
$R_3$ is hydrogen or an alkyl group having 1 to 3 carbon atoms, and
$R_4$ and $R_5$ are each independently an alkylene group having 1 to 10 carbon atoms.

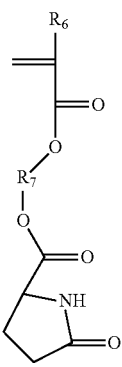

[Formula 3]

wherein, in Formula 3, $R_6$ is hydrogen or an alkyl group having 1 to 3 carbon atoms, and $R_7$ is an alkylene group having 1 to 10 carbon atoms.

According to another embodiment, the present disclosure provides a lithium secondary battery including a positive electrode including a positive electrode active material; a negative electrode including a negative electrode active material; a separator disposed between the negative electrode and the positive electrode; and the non-aqueous electrolyte solution for a lithium secondary battery according to the present disclosure.

Advantageous Effects

Since a non-aqueous electrolyte solution for a lithium secondary battery of the present disclosure includes an oligomer which is obtained from a monomer based on an acrylate structure including a nitrile group (—CN) and a monomer based on an acrylate structure including a lactam group, it may form a stable film on surfaces of a negative electrode and a positive electrode, may simultaneously chelate dissolved metal ions, and may suppress a side reaction due to anions by forming a complex with the anions dissociated from a lithium salt.

Thus, if the non-aqueous electrolyte solution for a lithium secondary battery of the present disclosure is used, a lithium secondary battery having improved high-temperature storage performance and cycle capacity retention during high-voltage operation may be achieved.

MODE FOR CARRYING OUT THE INVENTION

Hereinafter, the present disclosure will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "*" in the present specification denotes a site connected to a main chain in an oligomer or connected to a bonding portion, such as another monomer, a substituent, or a terminal group, in a formula.

Non-Aqueous Electrolyte Solution for Lithium Secondary Battery

According to an embodiment, the present disclosure provides a non-aqueous electrolyte solution for a lithium secondary battery.

The non-aqueous electrolyte solution for a lithium secondary battery includes:

a lithium salt;

a non-aqueous organic solvent; and an oligomer including a repeating unit derived from a monomer represented by the following Formula 1, a repeating unit derived from a monomer represented by the following Formula 2, and a repeating unit derived from a monomer represented by the following Formula 3:

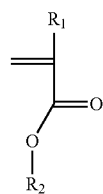

[Formula 1]

In Formula 1, $R_1$ is hydrogen or an alkyl group having 1 to 3 carbon atoms, and $R_2$ is an alkyl group having 1 to 20 carbon atoms.

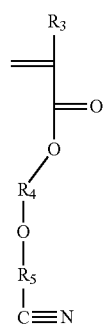

[Formula 2]

In Formula 2, $R_3$ is hydrogen or an alkyl group having 1 to 3 carbon atoms, and $R_4$ and $R_5$ are each independently an alkylene group having 1 to 10 carbon atoms.

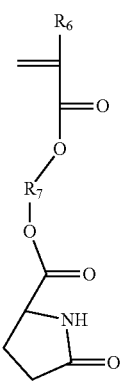

[Formula 3]

In Formula 3,

R$_6$ is hydrogen or an alkyl group having 1 to 3 carbon atoms, and

R$_7$ is an alkylene group having 1 to 10 carbon atoms.

(1) Lithium Salt

First, the lithium salt will be described as follows.

Any lithium salt typically used in an electrolyte solution for a lithium secondary battery may be used as the lithium salt without limitation, and, for example, the lithium salt may include Li$^+$ as a cation, and may include at least one selected from the group consisting of F$^-$, Cl$^-$, Br$^-$, I$^-$, NO$_3^-$, N(CN)$_2^-$, BF$_4^-$, ClO$_4^-$, B$_{10}$Cl$_{10}^-$, AlCl$_4^-$, AlO$_4^-$, PF$_6^-$, CF$_3$SO$_3^-$, CH$_3$CO$_2^-$, CF$_3$CO$_2^-$, AsF$_6^-$, SbF$_6^-$, CH$_3$SO$_3^-$, (CF$_3$CF$_2$SO$_2$)$_2$N$^-$, (CF$_3$SO$_2$)$_2$N$^-$, (FSO$_2$)$_2$N$^-$, BF$_2$C$_2$O$_4^-$, BC$_4$O$_8^-$, PF$_4$C$_2$O$_4^-$, PF$_2$C$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, C$_4$F$_9$SO$_3^-$, CF$_3$CF$_2$SO$_3^-$, CF$_3$CF$_2$(CF$_3$)$_2$CO$^-$, (CF$_3$SO$_2$)$_2$CH$^-$, CF$_3$(CF$_2$)$_7$SO$_3^-$, and SCN$^-$ as an anion.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, LiN(SO$_2$F)$_2$ (Lithium bis(fluorosulfonyl)imide, LiFSI), LiN(SO$_2$CF$_2$CF$_3$)$_2$ (lithium bis(pentafluoroethanesulfonyl)imide, LiBETI), and LiN(SO$_2$CF$_3$)$_2$ (lithium bis(trifluoromethanesulfonyl)imide, LiTFSI) or a mixture of two or more thereof, and a lithium salt typically used in an electrolyte solution of a lithium secondary battery may be used without limitation in addition to the above-described lithium salt. Specifically, the lithium salt may include LiPF$_6$.

The lithium salt may be appropriately changed in a normally usable range, but may be included in a concentration of 0.8 M to 3.0 M, specifically, 1.0 M to 3.0 M in the electrolyte solution to obtain an optimum effect of forming a film for preventing corrosion of a surface of an electrode. In a case in which the concentration of the lithium salt satisfies the above range, viscosity of the non-aqueous electrolyte solution may be controlled to achieve optimal impregnability, and mobility of lithium ions may be improved to obtain an effect of improving capacity characteristics and cycle characteristics of the lithium secondary battery.

(2) Non-Aqueous Organic Solvent

Also, a description of the non-aqueous organic solvent is as follows.

Various non-aqueous organic solvents typically used in a non-aqueous electrolyte solution may be used as the non-aqueous organic solvent without limitation, wherein a type thereof is not limited as long as decomposition due to an oxidation reaction during charge and discharge of the secondary battery may be minimized and desired properties may be exhibited together with an additive.

Specifically, the non-aqueous organic solvent may include at least one of a highly viscous cyclic carbonate-based compound that well dissociates the lithium salt due to high permittivity and a linear carbonate-based compound having low viscosity and low permittivity.

The cyclic carbonate-based compound may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and may include ethylene carbonate among them.

The linear carbonate-based compound may include at least one selected from the group consisting of dimethyl carbonate (DMC), diethyl carbonate (DEC), dipropyl carbonate, ethyl methyl carbonate (EMC), methylpropyl carbonate, and ethylpropyl carbonate, and may specifically include ethyl methyl carbonate (EMC).

In the present disclosure, the cyclic carbonate-based compound and the linear carbonate-based compound may be mixed and used, and, in this case, a mixing ratio of the cyclic carbonate-based compound to the linear carbonate-based compound may be a volume ratio of 10:90 to 80:20, specifically, a volume ratio of 30:70 to 50:50.

In a case in which the mixing ratio of the cyclic carbonate-based organic solvent to the linear carbonate-based organic solvent satisfies the above range, a non-aqueous electrolyte solution having higher electrical conductivity may be prepared.

In the present disclosure, in order to improve disadvantages of the carbonate-based compound and increase stability during high-temperature and high-voltage operation at the same time, a propionate compound may be further mixed as the non-aqueous organic solvent.

The propionate compound may include at least one selected from the group consisting of methyl propionate, ethyl propionate (EP), propyl propionate, and butyl propionate, and may specifically include at least one of ethyl propionate and propyl propionate.

A remainder excluding components other than the non-aqueous organic solvent, for example, the lithium salt, the oligomer, and optional additives, in the non-aqueous electrolyte solution for a lithium secondary battery of the present disclosure may all be the non-aqueous organic solvent unless otherwise stated.

(3) Oligomer

The non-aqueous electrolyte solution for a lithium secondary battery of the present disclosure includes an oligomer.

The oligomer may include a repeating unit derived from a monomer represented by Formula 1 below, a repeating unit derived from a monomer represented by Formula 2 below, and a repeating unit derived from a monomer represented by Formula 3 below.

[Formula 1]

In Formula 1, $R_1$ is hydrogen or an alkyl group having 1 to 3 carbon atoms, and $R_2$ is an alkyl group having 1 to 20 carbon atoms.

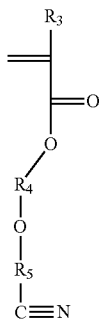

[Formula 2]

In Formula 2, $R_3$ is hydrogen or an alkyl group having 1 to 3 carbon atoms, and $R_4$ and $R_5$ are each independently an alkylene group having 1 to 10 carbon atoms.

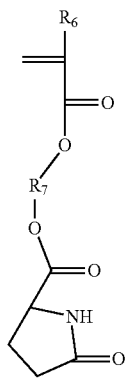

[Formula 3]

In Formula 3, $R_6$ is hydrogen or an alkyl group having 1 to 3 carbon atoms, and $R_7$ is an alkylene group having 1 to 10 carbon atoms.

Since the oligomer of the present disclosure includes a repeating unit structure which is derived from the monomer including a terminal nitrile group based on an acrylate-based structure, it may form a stable film on a surface of a positive electrode and may control metal ion dissolution by forming a strong coordination bond with metal ions dissolved from the positive electrode. Thus, high-temperature durability, high-temperature storage characteristics, and high-temperature stability of the battery may be improved.

Also, since the oligomer of the present disclosure includes a repeating unit structure which is derived from the monomer including a terminal lactam group based on an acrylate-based structure, it may form a complex while being coordinated with a thermal decomposition product of the lithium salt or anions dissociated from the lithium salt, and, accordingly, the thermal decomposition product of the lithium salt or the anions dissociated from the lithium salt may be stabilized to suppress a side reaction between them and the electrolyte solution for a lithium secondary battery.

Since the non-aqueous electrolyte solution including the oligomer of the present disclosure may suppress the side reaction of the electrolyte solution and may form a robust solid electrolyte interface (SEI) with low resistance, it may suppress gas generation by preventing a side reaction between the electrode and the electrolyte solution. Also, it may improve the cycle characteristics of the lithium secondary battery by significantly reducing failure rate by decreasing internal resistance of the battery.

The oligomer of the present disclosure may be an oligomer represented by Formula 4 below.

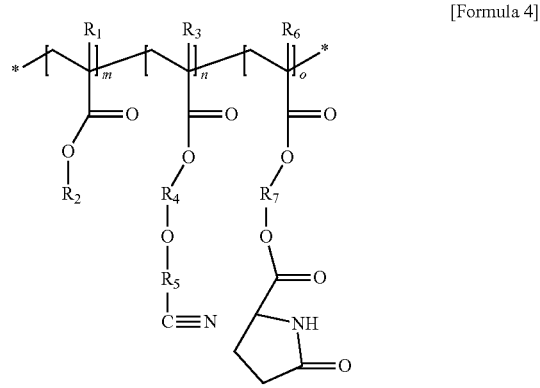

[Formula 4]

In Formula 4, $R_1$, $R_3$, and $R_6$ are each independently hydrogen or an alkyl group having 1 to 3 carbon atoms, $R_2$ is an alkyl group having 1 to 20 carbon atoms, $R_4$, $R_5$, and $R_7$ are each independently an alkylene group having 1 to 10 carbon atoms, m is in a range of 0.1 moles to 30 moles, n is in a range of 0.1 moles to 80 moles, and o is in a range of 0.1 moles to 80 moles.

Specifically, in Formula 4, $R_2$ may be an alkyl group having 1 to 10 carbon atoms, and may preferably be an alkyl group having 1 to 7 carbon atoms.

Also, in Formula 4, $R_4$ and $R_5$ may each independently be an alkylene group having 1 to 7 carbon atoms, and may preferably each independently be an alkylene group having 1 to 5 carbon atoms.

Furthermore, in Formula 4, $R_7$ may be an alkylene group having 1 to 7 carbon atoms, and may preferably be an alkylene group having 1 to 5 carbon atoms.

Preferably, the oligomer may be at least one selected from the group consisting of oligomers represented by Formulae 4-1 and 4-2 below.

[Formula 4-1]

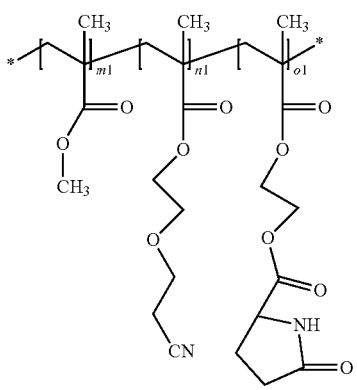

In Formula 4-1,
m1 is in a range of 0.1 moles to 30 moles,
n1 is in a range of 0.1 moles to 80 moles, and
o1 is in a range of 0.1 moles to 80 moles.

[Formula 4-2]

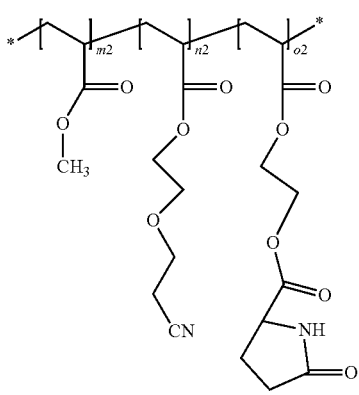

In Formula 4-2,
m2 is in a range of 0.1 moles to 30 moles,
n2 is in a range of 0.1 moles to 80 moles, and
o2 is in a range of 0.1 moles to 80 moles.

A weight-average molecular weight (Mw) of the oligomer of the present disclosure may be controlled by the number of repeating units, and may be in a range of about 3,000 g/mol to about 300,000 g/mol, specifically, 5,000 g/mol to 50,000 g/mol. If the weight-average molecular weight of the oligomer is within the above range, since physical properties of the oligomer itself are prevented from being rigid, affinity for the non-aqueous electrolyte solution solvent is increased to allow the oligomer to be easily dissolved, and thus, formation of a uniform and excellent non-aqueous electrolyte solution may be expected.

The weight-average molecular weight may be measured using a gel permeation chromatography (GPC) apparatus, and, unless otherwise specified, a molecular weight may mean the weight-average molecular weight. For example, as GPC conditions in the present disclosure, measurement is made using 1200 series by Agilent Technologies, a PL mixed B column by Agilent Technologies may be used as a column used in this case, and THF or DMF may be used as a solvent.

Also, the oligomer may be included in an amount of 0.1 wt % to 25 wt % based on a total weight of the non-aqueous electrolyte solution for a lithium secondary battery. If the oligomer is included in the above amount range, an effect of improving anion stabilization and an effect of forming a stable film may be achieved.

In a case in which the oligomer amount is 0.1 wt % or more, the anion stabilization may be more stably maintained due to the formation of a complex with anions during battery operation, and the metal ion dissolution may be suppressed by complex formation with metal ions and film formation due to positive electrode surface adsorption. Furthermore, in a case in which the amount of the oligomer is 25 wt % or less, degradation of capacity and cycle characteristics may be prevented because an increase in the viscosity of the electrolyte solution due to an excess of the compound may be prevented and mobility of ions in the battery may be improved at the same time, a cell swelling inhibition effect may be significantly improved, and an increase in battery resistance may be effectively prevented by suppressing excessive film formation.

Specifically, the oligomer may be included in an amount of 0.5 wt % to 20 wt %, preferably 0.5 wt % to 15 wt %, and more preferably 0.5 wt % to 7.0 wt % based on the total weight of the non-aqueous electrolyte solution for a lithium secondary battery.

(4) Other Additives

Also, the non-aqueous electrolyte solution for a lithium secondary battery of the present disclosure may further include additional other additives, if necessary, in order to prevent the occurrence of collapse of a negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additives may be at least one selected from the group consisting of a cyclic carbonate-based compound, a halogen-substituted carbonate-based compound, a sultone-based compound, a sulfate-based compound, a phosphate-based or phosphite-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate (VEC).

The halogen-substituted carbonate-based compound may include fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one selected from the group consisting of lithium difluoro(bisoxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound, for example, may include tetraphenylborate, and lithium oxalyldifluoroborate (LiODFB) or lithium bis(oxalato)borate (LiB($C_2O_4$)$_2$, LiBOB) which may form a film on a surface of the negative electrode.

The nitrile-based compound may include a compound other than 1,4-dicyano-2-butene and 1,3,5-cyclohexanetricarbonitrile, for example, at least one compound selected from the group consisting of succinonitrile, pimelonitrile, adiponitrile, acetonitrile, propionitrile, butyronitrile, valeronitrile, caprylonitrile, heptannitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may be fluorobenzene.

The amine-based compound may be triethanolamine or ethylenediamine, and the silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

Among these other additives, in order to form a more robust SEI film on the surface of the negative electrode, other additives with an excellent film-forming effect on the surface of the negative electrode, specifically, at least one selected from the group consisting of VC, 1,3-PS, Esa, vinylethylene carbonate, fluoroethylene carbonate (FEC), lithium oxalyldifluoroborate (LiODFB), 1,4-dicyano-2-butene, and 1,3,5-cyclohexanetricarbonitrile may be included.

Two or more compounds may be mixed and used as the other additives, and the other additives may be included in an amount of 0.01 wt % to 50 wt %, particularly 0.01 wt % to 10 wt %, and preferably 0.05 wt % to 5 wt % in the non-aqueous electrolyte solution. When the amount of the other additives is within the above range, it is desirable because occurrence of an excessive side reaction and residue of unreacted material of the other additives due to excessive addition may be prevented while an effect of improving the cycle characteristics by the other additives is sufficiently achieved.

Lithium Secondary Battery

Also, another embodiment of the present disclosure provides a lithium secondary battery including the non-aqueous electrolyte solution for a lithium secondary battery of the present disclosure. Specifically, the lithium secondary battery may include a positive electrode, a negative electrode, and the above-described non-aqueous electrolyte solution for a lithium secondary battery.

After an electrode assembly, in which a positive electrode, a negative electrode, and a separator between the positive electrode and the negative electrode are sequentially stacked, is formed and accommodated in a battery case, the lithium secondary battery of the present disclosure may be prepared by injecting the non-aqueous electrolyte solution of the present disclosure.

The lithium secondary battery of the present disclosure may be prepared according to a conventional method known in the art and used, and a method of preparing the lithium secondary battery of the present disclosure specifically is the same as described below.

(1) Positive Electrode

The positive electrode according to the present disclosure may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide represented by the following Formula 5 which includes lithium and at least one metal selected from the group consisting of nickel (Ni), cobalt (Co), manganese (Mn), iron (Fe), and aluminum (Al).

$$Li_{1+a}Ni_xCo_yM^1_zM^2_wO_2 \qquad \text{[Formula 5]}$$

In Formula 5, $M^1$ is manganese (Mn), aluminum (Al), or a combination thereof, $M^2$ is at least one selected from the group consisting of Al, zirconium (Zr), tungsten (W), titanium (Ti), magnesium (Mg), calcium (Ca), and strontium (Sr), and $0 \leq a \leq 0.5$, $0 < x \leq 1.0$, $0 < y \leq 0.4$, $0 < z \leq 0.4$, and $0 \leq w \leq 0.1$.

1+a represents an atomic fraction of lithium in the lithium transition metal oxide, wherein a may satisfy $0 \leq a \leq 0.5$, preferably $0 \leq a \leq 0.2$, and more preferably $0 \leq a \leq 0.1$.

x represents an atomic fraction of nickel among total transition metal elements in the lithium transition metal oxide, wherein x may satisfy $0 < x \leq 1.0$, particularly $0.55 < x < 1.0$, and more particularly $0.6 \leq x \leq 0.98$, for example, $0.6 \leq x \leq 0.95$.

y represents an atomic fraction of cobalt among the total transition metal elements in the lithium transition metal oxide, wherein y may satisfy $0 < y \leq 0.4$, particularly $0 < y \leq 0.3$, and more particularly $0.05 \leq y \leq 0.3$.

z represents an atomic fraction of $M^1$ element among the total transition metal elements in the lithium transition metal oxide, wherein z may satisfy $0 < z \leq 0.4$, preferably $0 < z \leq 0.3$, and more preferably $0.01 \leq z \leq 0.3$.

w represents an atomic fraction of $M^2$ element among the total transition metal elements in the lithium transition metal oxide, wherein w may satisfy $0 < w \leq 0.1$, preferably $0 < w \leq 0.05$, and more preferably $0 < w \leq 0.02$.

Specifically, the positive electrode active material may include a lithium composite transition metal oxide, such as $Li(Ni_{0.6}Mn_{0.2}Co_{0.2})O_2$, $Li(Ni_{0.7}Mn_{0.15}Co_{0.15})O_2$, $Li(Ni_{0.7}Mn_{0.2}Co_{0.1})O_2$, $Li(Ni_{0.8}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$, or $Li(Ni_{0.90}Mn_{0.05}Co_{0.05})O_2$, in which a Ni content is 0.55 at % or more, in order to achieve a high-capacity battery.

In a case in which high-nickel (Hi-Ni) having a Ni content greater than 0.55 at % is used as the lithium transition metal oxide, since sizes of $Li^+$ ion and $Ni^{2+}$ ion are similar to each other, a cation mixing phenomenon occurs in which positions of the $Li^+$ ion and the $Ni^{2+}$ ion are changed each other in a layered structure of the positive electrode active material during charge and discharge process. That is, a nickel transition metal having a d orbital must have an octahedron structure during coordinate bonding in an environment, such as a high temperature, according to a change in oxidation number of Ni contained in the positive electrode active material, but a crystal structure of the positive electrode active material may be deformed and collapsed while a twisted octahedron is formed by a non-uniform reaction in which the order of the energy level is reversed or the oxidation number is changed by external energy supply. Furthermore, as another side reaction, in which a transition metal, particularly, a nickel metal is dissolved from the positive electrode active material due to a side reaction between the positive electrode active material and the electrolyte solution during high-temperature storage, is caused, overall performance of the secondary battery is degraded due to structural collapse of the positive electrode active material along with the depletion of the electrolyte solution.

In the present disclosure, this problem may be improved by using the non-aqueous electrolyte solution including additives having a specific configuration and the positive electrode containing a high content nickel (Hi-Ni) transition metal oxide, as a positive electrode active material, together. That is, since a robust ion conductive film is formed on the surface of the positive electrode by the non-aqueous electrolyte solution of the present disclosure, the cation mixing phenomenon of the $Li^+$ ion and the $Ni^{2+}$ ion is suppressed and a side reaction between the positive electrode and the electrolyte solution or metal dissolution phenomenon is effectively suppressed, and thus, structural instability of the high-capacity electrode may be alleviated. Therefore, since the sufficient amount of the nickel transition metal for ensuring the capacity of the lithium secondary battery may be secured, the energy density may be increased to improve output characteristics.

The positive electrode active material of the present disclosure may use lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), or $Li(Ni_{p1}Co_{q1}Mn_{r2})O_4$ (where $0<p1<2$, $0<q1<2$, $0<r2<2$, and $p1+q1+r2=2$), etc.) in combination with the lithium composite metal oxide represented by Formula 5 depending on the use of the secondary battery.

The positive electrode active material may be included in an amount of 80 wt % to 98 wt %, more specifically, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery. Specific examples of the conductive agent may be a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, and any one thereof or a mixture of two or more thereof may be used.

The conductive agent may be included in an amount of 0.1 wt % to 10 wt %, preferably, 0.1 wt % to 5 wt % based on the total weight of the positive electrode active material layer.

Next, the binder improves the adhesion between positive electrode active material particles and the adhesion between the positive electrode active material and a current collector.

As an example of the binder, any one of a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder or a mixture of two or more thereof may be used.

The binder may be included in an amount of 0.1 wt % to 15 wt %, preferably, 0.1 wt % to 10 wt % based on the total weight of the positive electrode active material layer.

The positive electrode of the present disclosure as described above may be prepared by a method of preparing a positive electrode which is known in the art. For example, the positive electrode may be prepared by a method in which a positive electrode current collector is coated with a positive electrode slurry, which is prepared by dissolving or dispersing the positive electrode active material, the binder, and/or the conductive agent in a solvent, dried, and then rolled to form an active material layer, or a method in which the positive electrode active material layer is cast on a separate support and a film separated from the support is then laminated on the positive electrode current collector.

The positive electrode current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode current collector may typically have a thickness of 3 μm to 500 μm, and microscopic irregularities may be formed on the surface of the current collector to improve the adhesion of the positive electrode active material. The positive electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if a positive electrode material mixture may be adjusted to have appropriate viscosity in consideration of a coating thickness of the positive electrode material mixture, manufacturing yield, and workability, and is not particularly limited.

(2) Negative Electrode

Next, a negative electrode will be described.

The negative electrode according to the present disclosure includes a negative electrode active material layer including a negative electrode active material, and the negative electrode active material layer may further include a conductive agent and/or a binder, if necessary.

Various negative electrode active materials used in the art, for example, a carbon-based negative electrode active material, a silicon-based negative electrode active material, or a mixture thereof may be used as the negative electrode active material.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the negative electrode active material may use at least one carbon-based negative electrode active material of natural graphite and artificial graphite, and may use natural graphite and artificial graphite together in order to suppress exfoliation of the active material by increasing adhesion with the current collector.

According to another embodiment, the negative electrode active material may include a silicon-based negative electrode active material together with the carbon-based negative electrode active material.

The silicon-based negative electrode active material, for example, may include at least one selected from the group consisting of metallic silicon (Si), silicon oxide ($SiO_x$, where silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), scandium (Sc), yttrium (Y), Ti, Zr, hafnium (Hf), rutherfordium (Rf), vanadium (V), niobium (Nb), tantalum (Ta), dubnium (Db), chromium (Cr), molybdenum (Mo), W, seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), tin (Sn), indium (In), Ti, germanium (Ge), phosphorus (P), arsenic (As), antimony (Sb), bismuth (Bi), sulfur (S), selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included. However, with respect to a negative electrode including the silicon-based negative electrode active material, it contains more oxygen (O)-rich components in the SEI than a graphite negative electrode, and the SEI containing the O-rich components tends to be more easily decomposed when a Lewis acid, such as HF or $PF_5$, is present in the electrolyte solution. Thus, with respect to the negative electrode including the silicon-based negative electrode active material, there is a need to suppress the formation of the Lewis acid, such as HF and $PF_5$, in the electrolyte solution or remove (or scavenge) the formed Lewis acid in order to stably maintain the SEI. Since the non-aqueous electrolyte solution according to the present disclosure forms a stable film on the positive electrode and the negative electrode and simultaneously includes an electrolyte solution additive having an excellent effect of scavenging the Lewis acid, it may effectively suppress the decomposition of the SEI when the negative electrode including the silicon-based negative electrode active material is used.

A mixing ratio of the silicon-based negative electrode active material to the carbon-based negative electrode active material may be in a range of 3:97 to 99:1, preferably, 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, preferably, 5 wt % or less based on the total weight of the negative electrode active material layer. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The binder may be included in an amount of 0.1 wt % to 15 wt %, preferably, 0.1 wt % to 10 wt % based on the total weight of the negative electrode active material layer.

The negative electrode may be prepared according to a method of preparing a negative electrode which is known in the art. For example, the negative electrode may be prepared by a method in which a negative electrode current collector is coated with a negative electrode active material slurry, which is prepared by dissolving or dispersing the negative electrode active material as well as optionally the binder and the conductive agent in a solvent, rolled and dried to form an active material layer, or may be prepared by casting the negative electrode active material layer on a separate support and then laminating a film separated from the support on the negative electrode current collector.

The negative electrode current collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode current collector may typically have a thickness of 3 μm to 500 μm, and, similar to the positive electrode current collector, microscopic irregularities may be formed on the surface of the current collector to improve the adhesion of the negative electrode active material. The negative electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present disclosure includes a separator between the positive electrode and the negative electrode.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present disclosure as described above may be suitably used in portable devices, such as mobile phones, notebook computers, and digital cameras, and electric cars such as hybrid electric vehicles (HEVs).

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in more detail according to examples. However, the invention may be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

Example 1

(Preparation of Non-Aqueous Electrolyte Solution for Lithium Secondary Battery)

After $LiPF_6$ was dissolved in a non-aqueous organic solvent, in which ethylene carbonate (EC):ethyl methyl carbonate (EMC) were mixed in a volume ratio of 30:70, such that a concentration of the $LiPF_6$ was 1.0 M, a non-aqueous electrolyte solution for a lithium secondary battery was prepared by adding 0.5 wt % of the oligomer represented by Formula 4-1 (m1: 20, n1: 70, o1: 10, weight-average molecular weight: 12,000 g/mol) and 1 wt % of vinylene carbonate, 0.5 wt % of 1,3-propane sultone, and 1.0 wt % of ethylene sulfate, as other additives (see Table 1 below).

(Lithium Secondary Battery Preparation)

A positive electrode active material ($Li(Ni_{0.8}Mn_{0.1}Co_{0.1})O_2$), a conductive agent (carbon black), and a binder (polyvinylidene fluoride) were added in a weight ratio of 97.5:1:1.5 to N-methyl-2-pyrrolidone (NMP), as a solvent, to prepare a positive electrode slurry (solid content: 50 wt %). A 12 μm thick positive electrode current collector (aluminum (Al) thin film) was coated with the positive electrode slurry, dried, and roll-pressed to prepare a positive electrode.

A negative electrode active material (artificial graphite:SiO=88:12 weight ratio), a binder (SBR-CMC), and a conductive agent (carbon black) were added to water, as a solvent, in a weight ratio of 95:3.5:1.5 to prepare a negative electrode slurry (solid content: 60 wt %). A 6 μm thick copper (Cu) thin film, as a negative electrode current collector, was coated with the negative electrode slurry, dried, and then roll-pressed to prepare a negative electrode.

After an electrode assembly was prepared by disposing a porous polymer separator formed of a polyolefin polymer between the above-prepared positive electrode and negative electrode in a dry room, the electrode assembly was accommodated in a pouch-type battery case, and the non-aqueous electrolyte solution for a lithium secondary battery was injected to prepare a pouch-type lithium secondary battery.

After an electrode assembly was prepared by disposing a polyolefin-based porous separator coated with inorganic particles ($Al_2O_3$) between the above-prepared positive electrode and negative electrode in a dry room, the electrode assembly was accommodated in a pouch-type battery case, and the non-aqueous electrolyte solution for a lithium secondary battery was injected to prepare a pouch-type lithium secondary battery.

Example 2

A non-aqueous electrolyte solution for a lithium secondary battery and a lithium secondary battery including the same were prepared in the same manner as in Example 1 except that, after $LiPF_6$ was dissolved in a non-aqueous organic solvent such that a concentration of the $LiPF_6$ was 1.0 M, the non-aqueous electrolyte solution for a lithium secondary battery was prepared by adding 5.0 wt % of the oligomer represented by Formula 4-1 (m1: 20, n1: 70, o1: 10, weight-average molecular weight: 12,000 g/mol) and 1 wt % of vinylene carbonate, 0.5 wt % of 1,3-propane sultone, and 1.0 wt % of ethylene sulfate, as other additives (see Table 1 below).

Example 3

A non-aqueous electrolyte solution for a lithium secondary battery and a lithium secondary battery including the same were prepared in the same manner as in Example 1 except that, after $LiPF_6$ was dissolved in a non-aqueous organic solvent such that a concentration of the $LiPF_6$ was 1.0 M, the non-aqueous electrolyte solution for a lithium secondary battery was prepared by adding 10.0 wt % of the oligomer represented by Formula 4-1 (m1: 20, n1: 70, o1: 10, weight-average molecular weight: 12,000 g/mol) and 1 wt % of vinylene carbonate, 0.5 wt % of 1,3-propane sultone, and 1.0 wt % of ethylene sulfate, as other additives (see Table 1 below).

Example 4

A non-aqueous electrolyte solution for a lithium secondary battery and a lithium secondary battery including the same were prepared in the same manner as in Example 1 except that, after $LiPF_6$ was dissolved in a non-aqueous organic solvent such that a concentration of the $LiPF_6$ was 1.0 M, the non-aqueous electrolyte solution for a lithium secondary battery was prepared by adding 30.0 wt % of the oligomer represented by Formula 4-1 (m1: 20, n1: 70, o1: 10, weight-average molecular weight: 12,000 g/mol) and 1 wt % of vinylene carbonate, 0.5 wt % of 1,3-propane sultone, and 1.0 wt % of ethylene sulfate, as other additives (see Table 1 below).

Comparative Example 1

A non-aqueous electrolyte solution for a lithium secondary battery and a lithium secondary battery including the same were prepared in the same manner as in Example 1 except that, after $LiPF_6$ was dissolved in a non-aqueous organic solvent such that a concentration of the $LiPF_6$ was 1.0 M, the non-aqueous electrolyte solution for a lithium secondary battery was prepared by adding 1 wt % of vinylene carbonate, 0.5 wt % of 1,3-propane sultone, and 1.0 wt % of ethylene sulfate, as other additives (see Table 1 below).

Comparative Example 2

A non-aqueous electrolyte solution for a lithium secondary battery and a lithium secondary battery including the same were prepared in the same manner as in Example 1 except that, after $LiPF_6$ was dissolved in a non-aqueous organic solvent such that a concentration of the $LiPF_6$ was 1.0 M, the non-aqueous electrolyte solution for a lithium secondary battery was prepared by adding 0.5 wt % of an oligomer represented by the following Formula 6 (a: 30, b: 70, weight-average molecular weight: 12,000 g/mol) and 1 wt % of vinylene carbonate, 0.5 wt % of 1,3-propane sultone, and 1.0 wt % of ethylene sulfate, as other additives (see Table 1 below).

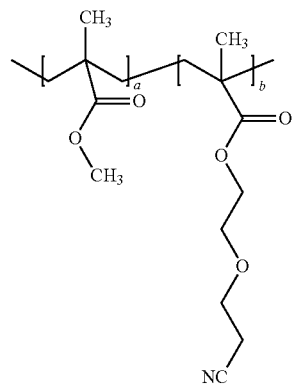

[Formula 6]

Comparative Example 3

A non-aqueous electrolyte solution for a lithium secondary battery and a lithium secondary battery including the same were prepared in the same manner as in Example 2 except that, after $LiPF_6$ was dissolved in a non-aqueous organic solvent such that a concentration of the $LiPF_6$ was 1.0 M, the non-aqueous electrolyte solution for a lithium secondary battery was prepared by adding 5.0 wt % of the oligomer represented by Formula 6 and 1 wt % of vinylene carbonate, 0.5 wt % of 1,3-propane sultone, and 1.0 wt % of ethylene sulfate, as other additives (see Table 1 below).

TABLE 1

| | Additives | | |
| | Oligomer | | |
| Examples | Formula | Amount (wt %) | Total amount of other additives (wt %) |
| --- | --- | --- | --- |
| Example 1 | 4-1 | 0.5 | 2.5 |
| Example 2 | 4-1 | 5.0 | 2.5 |
| Example 3 | 4-1 | 10.0 | 2.5 |
| Example 4 | 4-1 | 30.0 | 2.5 |
| Comparative Example 1 | — | — | 2.5 |
| Comparative Example 2 | 6 | 0.5 | 2.5 |
| Comparative Example 3 | 6 | 5.0 | 2.5 |

EXPERIMENTAL EXAMPLES

Experimental Example 1. High-Temperature Cycle Characteristics Evaluation (1)

Each of the lithium secondary batteries prepared in Examples 1 to 3 and Comparative Examples 1 to 3 was charged at 0.33 C rate to 4.2 V under a constant current/constant voltage condition at 45° C. and then discharged at 0.33 C rate under a constant current condition to 3 V was defined as one cycle, and, after 1 cycle was performed, discharge capacity and resistance after 1 cycle were measured.

Then, capacity retention (%) and resistance increase rate (%) were measured after 100 cycles of charge and discharge were performed under the one-cycle conditions. The capacity retention (%) was calculated according to [Equation 1] below, and the resistance increase rate (%) was calculated according to [Equation 2] below. Measurement results are listed in Table 2 below.

Capacity retention (%)=(discharge capacity after 100 cycles/discharge capacity after 1 cycle)×100  [Equation 1]

Resistance increase rate (%)={(resistance after 100 cycles−resistance after 1 cycle)/resistance after 1 cycle}×100  [Equation 2]

Experimental Example 2. High-Temperature Cycle Characteristics Evaluation (2)

Each of the lithium secondary batteries prepared in Examples 1 to 3 and Comparative Examples 1 to 3 was charged at 0.33 C rate to 4.2 V under a constant current/constant voltage condition at 45° C. and then discharged at 0.33 C rate under a constant current condition to 3 V was defined as one cycle and, after 1 cycle was performed, an initial thickness was measured. Then, after a volume increase rate was calculated by measuring a thickness after 100 cycles of charge and discharge were performed under the one-cycle conditions, the results thereof are listed in Table 2 below.

TABLE 2

|  | Capacity retention (%) after 100 cycles | Resistance increase rate (%) after 100 cycles | Volume increase rate (%) after 100 cycles |
|---|---|---|---|
| Example 1 | 98.0 | 1.9 | 2.9 |
| Example 2 | 98.8 | 1.5 | 2.6 |
| Example 3 | 97.6 | 2.2 | 3.2 |
| Comparative Example 1 | 87.6 | 6.0 | 8.5 |
| Comparative Example 2 | 91.3 | 4.3 | 5.4 |
| Comparative Example 3 | 92.2 | 3.6 | 5.1 |

Referring to Table 2, with respect to the secondary batteries of Examples 1 to 3 of the present disclosure, it may be understood that capacity retentions (%), resistance increase rates (%), and volume increase rates (%) after 100 cycles at a high temperature (45° C.) were improved in comparison to those of the secondary batteries of Comparative Examples 1 to 3.

Experimental Example 3. Volume Increase Rate Evaluation After High-Temperature Storage After each of the lithium secondary batteries prepared in Examples 1 to 3 and the lithium secondary batteries prepared in Comparative Examples 1 to 3 was charged at 0.33 C rate to 4.2 V under a constant current/constant voltage condition at room temperature (25° C.), each lithium secondary battery was discharged to a DOD (depth of discharge) of 50% to adjust a state of charge (SOC) to 50% and discharged at 2.5 C rate for 10 seconds, and an initial volume was then measured.

Then, after each lithium secondary battery was stored at 60° C. for 8 weeks, a volume after high-temperature storage of each lithium secondary battery was measured to check a volume increase rate, and the results thereof are listed in Table 3 below.

TABLE 3

|  | Volume increase rate after high-temperature storage (%) |
|---|---|
| Example 1 | 1.2 |
| Example 2 | 0.9 |
| Example 3 | 1.8 |
| Comparative Example 1 | 3.7 |
| Comparative Example 2 | 3.0 |
| Comparative Example 3 | 2.7 |

Referring to Table 3, with respect to the secondary batteries of Examples 1 to 3 of the present disclosure, it may be confirmed that volume increase rates (%) after high-temperature storage were reduced in comparison to those of the secondary batteries of Comparative Examples 1 to 3.

Experimental Example 4. Recovery Capacity Evaluation

Each of the lithium secondary batteries prepared in Examples 1 to 4 and the lithium secondary batteries prepared in Comparative Examples 1 to 3 was fully charged to a SOC of 100% (4356 mAh) under a voltage condition of 4.45 V. Thereafter, at 25° C., the temperature was increased to 60° C. at a heating rate of 0.7° C./min, each lithium secondary battery was stored at 60° C. for 8 weeks, was then charged at 0.33 C and discharged at 0.33 C to measure recovery capacity, and the results thereof are presented in Table 4 below.

TABLE 4

|  | Recovery capacity (%) |
|---|---|
| Example 1 | 96.4 |
| Example 2 | 97.2 |
| Example 3 | 95.9 |
| Example 4 | 83.1 |
| Comparative Example 1 | 86.0 |
| Comparative Example 2 | 91.9 |
| Comparative Example 3 | 93.2 |

Referring to Table 4, with respect to the secondary batteries of Examples 1 to 4 of the present disclosure, it may be understood that recovery capacities (%) were improved in comparison to those of the secondary batteries of Comparative Examples 1 to 3. With respect to the secondary battery of Example 4 in which a somewhat large amount of the additive was included, it may be understood that the recovery capacity (%) was reduced in comparison to those of the secondary batteries of Examples 1 to 3 due to an increase in internal resistance of the battery.

Experimental Example 5. Metal Dissolution Amount Evaluation

Each of the lithium secondary batteries prepared in Examples 1 to 4 and the lithium secondary batteries prepared in Comparative Examples 1 to 3 was fully charged to a SOC of 100% (4356 mAh) under a voltage condition of 4.45 V. Thereafter, at 25° C., the temperature was increased to 60° C. at a heating rate of 0.7° C./min, each lithium secondary battery was stored at 60° C. for 8 weeks, was then charged at 0.33 C and discharged at 0.33 C, and was disassembled in a fully discharged state to analyze amounts of Ni, Co, and Mn which were precipitated in the negative electrode (ICP-OES, Perkin Elmer, AVIO 500), and the results thereof are presented in Table 5 below.

TABLE 5

| | Total metal (Ni, Co, Mn) dissolution amount (ppm) |
|---|---|
| Example 1 | 176 |
| Example 2 | 134 |
| Example 3 | 87 |
| Example 4 | 74 |
| Comparative Example 1 | 303 |
| Comparative Example 2 | 105 |
| Comparative Example 3 | 98 |

Referring to Table 5, with respect to the secondary batteries of Examples 1 to 4 of the present disclosure, it may be confirmed that metal ion dissolution amounts after high-temperature storage were reduced in comparison to those of the secondary batteries of Comparative Examples 1 to 3. As a result, it may be understood that the lithium secondary battery using the non-aqueous electrolyte solution of the present disclosure had an improved metal dissolution suppression effect.

The invention claimed is:

1. A non-aqueous electrolyte solution for a lithium secondary battery, the non-aqueous electrolyte solution comprising:
   a lithium salt;
   a non-aqueous organic solvent; and
   an oligomer including:
      a repeating unit derived from a monomer represented by Formula 1,
      a repeating unit derived from a monomer represented by Formula 2, and
      a repeating unit derived from a monomer represented by Formula 3:

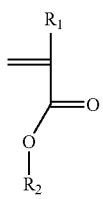

[Formula 1]

wherein, in the Formula 1,
$R_1$ is hydrogen or an alkyl group having 1 to 3 carbon atoms, and
$R_2$ is an alkyl group having 1 to 20 carbon atoms;

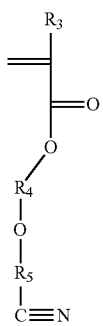

[Formula 2]

wherein, in the Formula 2,
$R_3$ is hydrogen or an alkyl group having 1 to 3 carbon atoms, and
$R_4$ and $R_5$ are each independently an alkylene group having 1 to 10 carbon atoms;

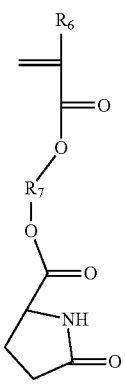

[Formula 3]

wherein, in the Formula 3,
$R_6$ is hydrogen or an alkyl group having 1 to 3 carbon atoms, and
$R_7$ is an alkylene group having 1 to 10 carbon atoms.

2. The non-aqueous electrolyte solution for a lithium secondary battery of claim 1, wherein the oligomer includes an oligomer represented by Formula 4:

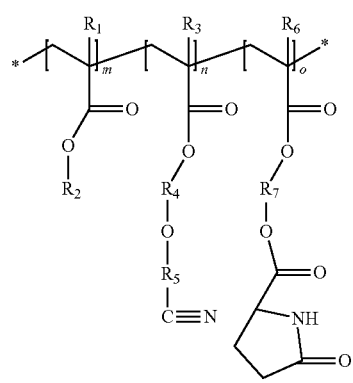

[Formula 4]

wherein, in the Formula 4,
$R_1$, $R_3$, and $R_6$ are each independently hydrogen or an alkyl group having 1 to 3 carbon atoms,
$R_2$ is an alkyl group having 1 to 20 carbon atoms,
$R_4$, $R_5$, and $R_7$ are each independently an alkylene group having 1 to 10 carbon atoms,
m is in a range of 0.1 moles to 30 moles,
n is in a range of 0.1 moles to 80 moles, and
is in a range of 0.1 moles to 80 moles.

3. The non-aqueous electrolyte solution for a lithium secondary battery of claim 2, wherein $R_2$ is an alkyl group having 1 to 10 carbon atoms,
$R_4$ and $R_5$ are each independently an alkylene group having 1 to 7 carbon atoms, and
$R_7$ is an alkylene group having 1 to 7 carbon atoms.

4. The non-aqueous electrolyte solution for a lithium secondary battery of claim 2, wherein $R_2$ is an alkyl group having 1 to 7 carbon atoms, $R_4$ and $R_5$ are each independently an alkylene group having 1 to 5 carbon atoms, and $R_7$ is an alkylene group having 1 to 5 carbon atoms.

5. The non-aqueous electrolyte solution for a lithium secondary battery of claim 2, wherein the oligomer is at least one selected from the group consisting of oligomers represented by Formulae 4-1 and 4-2:

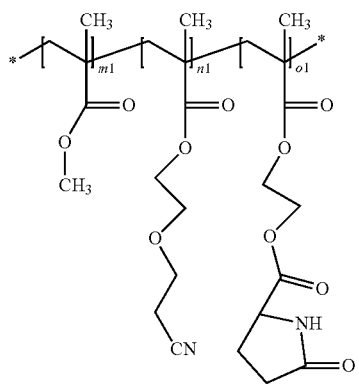

[Formula 4-1]

wherein, in the Formula 4-1,
m1 is in a range of 0.1 moles to 30 moles,
n1 is in a range of 0.1 moles to 80 moles, and
o1 is in a range of 0.1 moles to 80 moles;

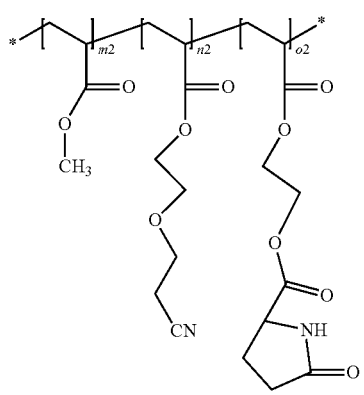

[Formula 4-2]

wherein, in the Formula 4-2,
m2 is in a range of 0.1 moles to 30 moles,
n2 is in a range of 0.1 moles to 80 moles, and
o2 is in a range of 0.1 moles to 80 moles.

6. The non-aqueous electrolyte solution for a lithium secondary battery of claim 1, comprising the oligomer in an amount of 0.1 wt % to 25 wt % based on a total weight of the non-aqueous electrolyte solution.

7. The non-aqueous electrolyte solution for a lithium secondary battery of claim 1, comprising the oligomer in an amount of 0.5 wt % to 20 wt % based on a total weight of the non-aqueous electrolyte solution.

8. The non-aqueous electrolyte solution for a lithium secondary battery of claim 1, further comprising at least one additive selected from the group consisting of a cyclic carbonate-based compound, a halogen-substituted carbonate-based compound, a sultone-based compound, a sulfate-based compound, a phosphate-based compound or a phosphite-based compound, a borate-based compound, a nitrile-based compound, a benzene-based compound, an amine-based compound, a silane-based compound, and a lithium salt-based compound.

9. A lithium secondary battery comprising:
a positive electrode including a positive electrode active material;
a negative electrode including a negative electrode active material;
a separator disposed between the negative electrode and the positive electrode; and
the non-aqueous electrolyte solution of claim 1.

10. The lithium secondary battery of claim 9, wherein the positive electrode active material comprises a lithium composite metal oxide represented by Formula 5:

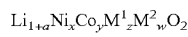 [Formula 5]

wherein, in the Formula 5,
$M^1$ includes manganese (Mn), aluminum (Al), or a combination thereof,
$M^2$ includes at least one selected from the group consisting of Al, zirconium (Zr), tungsten (W), titanium (Ti), magnesium (Mg), calcium (Ca), and strontium (Sr),
$0 \leq a \leq 0.5$,
$0 < x \leq 1.0$,
$0 < y \leq 0.4$,
$0 < z \leq 0.4$, and
$0 \leq s \leq 0.1$.

11. The non-aqueous electrolyte solution of claim 1, comprising the oligomer in an amount of 0.5 wt % to 15 wt % based on a total weight of the non-aqueous electrolyte solution.

12. The non-aqueous electrolyte solution of claim 1, wherein $R_1$, $R_3$, and $R_6$ are each independently an alkyl group having 1 to 3 carbon atoms.

13. The non-aqueous electrolyte solution of claim 12, wherein $R_1$, $R_3$, and $R_6$ are each independently an alkyl group having 1 carbon atom.

14. The non-aqueous electrolyte solution of claim 13, wherein $R_2$ is an alkyl group having 1 carbon atom.

15. The non-aqueous electrolyte solution of claim 5, wherein the oligomer includes the oligomer represented by the Formula 4-1.

16. The non-aqueous electrolyte solution of claim 1, wherein a weight-average molecular weight of the oligomer is in a range of 5,000 g/mol to 50,000 g/mol.

17. The lithium secondary battery of claim 10, wherein $M^1$ includes manganese (Mn).

18. The lithium secondary battery of claim 10, wherein w is 0.

19. The lithium secondary battery of claim 9, wherein the positive electrode active material includes at least one from $Li(Ni_{0.6}Mn_{0.2}Co_{0.2})O_2$, $Li(Ni_{0.7}Mn_{0.15}Co_{0.15})O_2$, $Li(Ni_{0.7}Mn_{0.2}Co_{0.1})O_2$, $Li(Ni_{0.8}Mn_{0.1}Co_{0.1})O_2$, $Li(Ni_{0.8}Co_{0.15}Al_{0.05})O_2$, $Li(Ni_{0.86}Mn_{0.07}Co_{0.05}Al_{0.02})O_2$, and $Li(Ni_{0.90}Mn_{0.05}Co_{0.05})O_2$.

20. The lithium secondary battery of claim 19, wherein the positive electrode active material includes $Li(Ni_{0.8}Mn_{0.1}Co_{0.1})O_2$.

* * * * *